(No Model.) 3 Sheets—Sheet 1.

J. P. JAMISON.
WOOD WORKING MACHINE.

No. 387,418. Patented Aug. 7, 1888.

Witnesses:
A. G. Donnelly
Frank E. Gray

Inventor:
John P. Jamison,
by Walter E. Lombard.
Attorney.

(No Model.) 3 Sheets—Sheet 2.

J. P. JAMISON.
WOOD WORKING MACHINE.

No. 387,418. Patented Aug. 7, 1888.

Witnesses:

Inventor:
John P. Jamison,
by Walter E. Lombard.
Attorney.

(No Model.) 3 Sheets—Sheet 3.
J. P. JAMISON.
WOOD WORKING MACHINE.
No. 387,418. Patented Aug. 7, 1888.
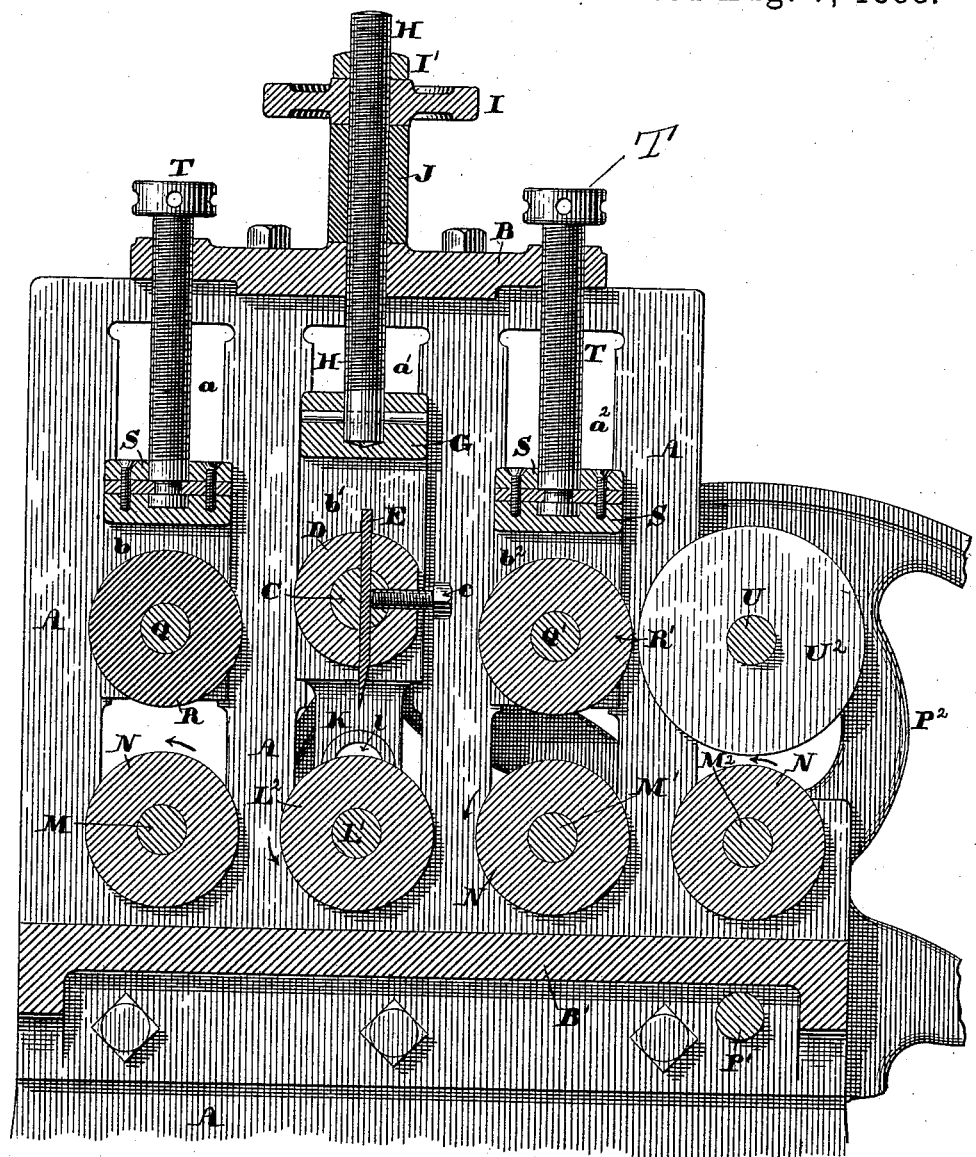
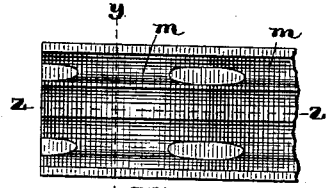
Witnesses:
Inventor:
John P. Jamison,
by Walter E. Lombard.
Attorney.

UNITED STATES PATENT OFFICE.

JOHN P. JAMISON, OF CAMBRIDGEPORT, MASSACHUSETTS.

WOOD-WORKING MACHINE.

SPECIFICATION forming part of Letters Patent No. 387,418, dated August 7, 1888.

Application filed March 17, 1888. Serial No. 267,445. (No model.)

*To all whom it may concern:*

Be it known that I, JOHN P. JAMISON, of Cambridgeport, in the county of Middlesex and State of Massachusetts, have invented certain new and useful Improvements in Wood-Working Machines, of which the following, taken in connection with the accompanying drawings, is a specification.

My invention relates to wood-working machinery, and particularly to that class of machines which are adapted for cutting or carving plain or ornamental designs into the surface of the wood fed thereto; and it consists in certain novel features of construction, arrangement, and combination of parts, which will be readily understood by reference to the description of the drawings and to the claims, to be hereinafter described.

Figure 1:
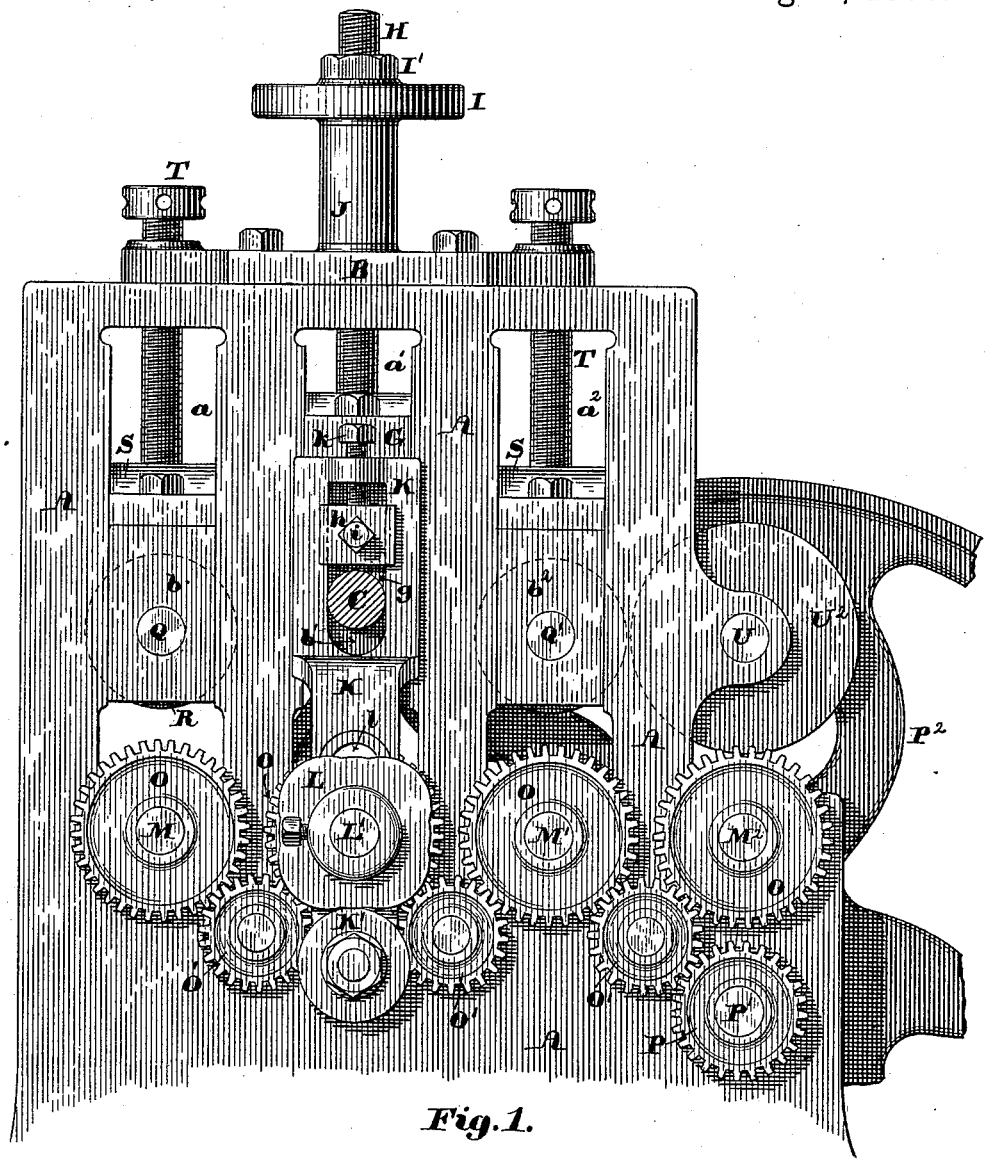
Figure 6:
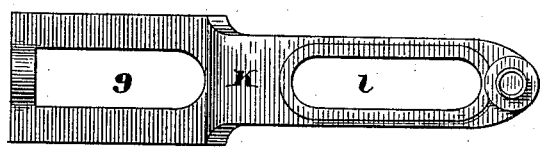
Figure 2:
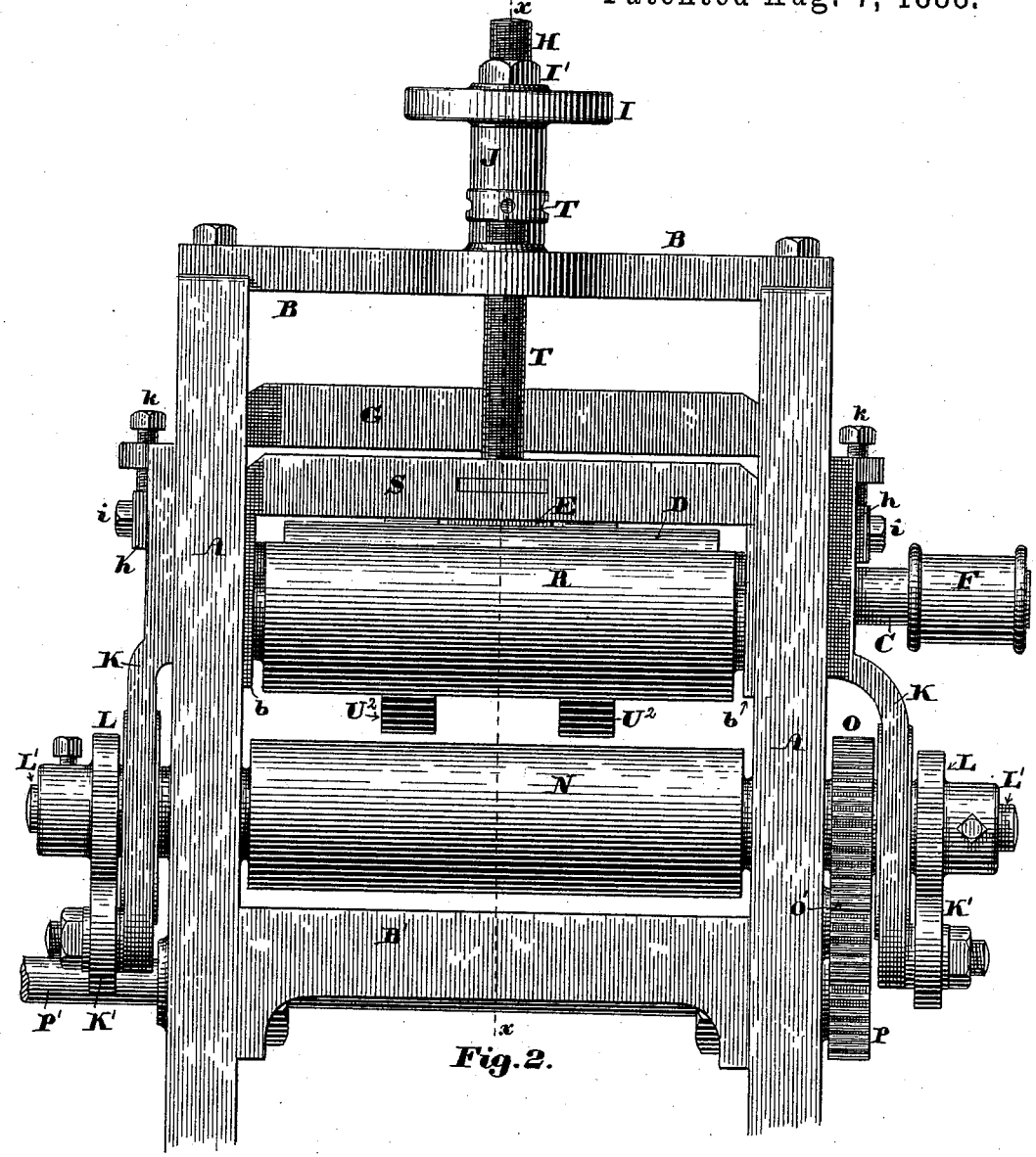
Figure 3:
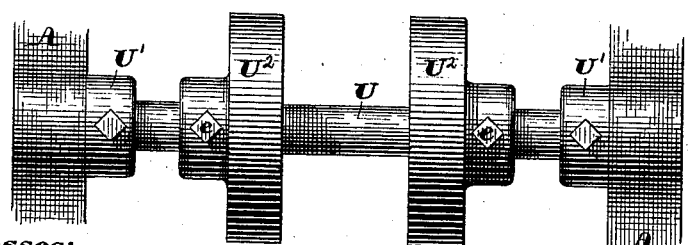

Of the drawings, Figure 1 represents a side elevation of the upper portion of a machine embodying my invention. Fig. 2 represents a front elevation of the same with the driving-pulley removed. Fig. 3 represents a rear elevation of a small portion of the machine, showing the guides for directing the stock to the cutter. Fig. 4 represents a sectional elevation of the machine, the cutting-plane being on line $x\ x$ on Fig. 2. Fig. 5 represents an elevation of the cutting-knife. Fig. 6 represents an elevation of the cam-truck-carrying bracket. Fig. 7 represents a plan of a portion of a strip of molding carved or cut upon my improved machine. Fig. 8 represents a longitudinal section of the same, the cutting-plane being on line $z\ z$ on Fig. 7; and Fig. 9 represents a transverse section of the same, the cutting-plane being on line $y\ y$ on Fig. 7.

In the drawings, A A are the side frames of the machine, connected together by the plates B and B', and provided with the openings $a$, $a'$, and $a^2$, in which are mounted the boxes $b$, $b'$, and $b^2$. The boxes $b'\ b'$ are provided with suitable bearings for the shaft C, upon which is firmly secured the sleeve D, midway between the two side frames, A A. A slot is cut through the sleeve D and shaft C, in which is mounted the knife or cutter E, which is firmly secured in position by the set-screw $c$. Upon the outer end of the shaft C is secured the pulley F, (shown in Fig. 2,) to which motion is imparted by a suitable belt (not shown) leading therefrom to a counter-shaft. The boxes $b'\ b'$, in which the shaft C is mounted, are secured together by the cross-head G, the ends of which are bolted to the upper ends of said boxes. To the center of the cross-head G is secured the long threaded shank H, which passes freely through the plate B, and has mounted upon its outer end the nut I and check-nut I', said shank being surrounded between said nut I and plate B by a rubber cushion or spring, J. To the outer side of each of the boxes $b'\ b'$ is secured a bracket, K, upon a stud, in the lower end of which is mounted the roll K', acted upon and operated by the cam-wheel L, which is firmly secured to the outer end of and revolves with the shaft L', located directly beneath the shaft C, and having mounted thereon the feed-roll $L^2$. Directly in front of the feed-roll $L^2$ is mounted in the side frames, A A, the shaft M, while directly behind are similarly mounted the shafts M' and $M^2$, upon each of which is mounted a feed-roll, N.

The shafts L', M, M', and $M^2$ are provided upon their outer ends with the gears O O, which mesh into the intermediate gears, O' O', one of which engages with the gear-wheel P, mounted upon the driving-shaft P', which has mounted upon its opposite end the driving-pulley $P^2$. Power being applied to the pulley $P^2$, motion is imparted to the train of gears O, O', and P, thus revolving the feed-rolls in the direction indicated by the arrows in Fig. 4.

In the boxes $b\ b$ and $b^2\ b^2$ are mounted the shafts Q and Q', upon which are mounted the pressure-rolls R and R', the former of which is made of rubber in order not to injure the design or carving cut into the wood as it passes from beneath the cutter. Cross-heads S connect together the pairs of boxes $b\ b$ and $b^2\ b^2$, each of which cross-heads has secured thereto a bolt, T, in such a manner that said bolt may be revolved within its bearing in said cross-head, while no movement lengthwise of said bearing is permitted. Said bolts T are mounted in threaded bearings in the plate B, and by being turned will raise or lower the pressure-rolls R and R' from or toward the material being fed to the cutter E, all as in a well-known manner.

In bearings formed in ears projecting from the rear of the side frames is mounted the shaft U, having secured thereto, so as to prevent endwise movement thereof, the collars U' U', and having mounted thereon the guide-disks U² U², so arranged that they may be adjusted toward or from each other and secured in position by the set-screws $e$ $e$.

The brackets K are each provided at its upper end with a slot, $g$, into which or through which passes the shaft C, while immediately above the shaft C the lipped or flanged block $h$ projects into said slot $g$ and is firmly secured to the block $b'$, which carries the shaft C by the bolt $i$. In the brackets K, above the blocks $h$, are mounted the set-screws $k$, the lower ends of which bear upon the upper surfaces of the blocks $h$ in such a manner that by turning said set-screws $k$ the said blocks $h$ may be moved lengthwise of said slot $g$ toward or from the cam-wheel L, according as it is desired to secure a greater or less depth of carving in the material being fed beneath the cutter E. The brackets K are provided with other slots, $l$, through which the shaft L' passes, thus allowing the vertical reciprocation of said brackets and the cutter E as the cam-truck K' passes over the projections of the cam-wheel L, the rubber spring J retaining said truck in contact with the cam-wheel L continually.

The operation of my improved machine is as follows: The guide-disks U² are set the proper distance apart to admit the material to be acted upon and guide it toward the cutter E, and the pressure-rolls R and R' are adjusted so as to bear upon the upper surface of the material, which is placed upon the rear feed-rolls, N, and fed slowly toward the said cutter E, power being applied to the driving-wheel P² and transmitted through the medium of the shaft P' and the gears O O' and P to the feed-rolls L² and N. The cutter E is revolved at a high rate of speed as the material passes beneath, while at the same time it is being slowly moved up and down with the boxes $b'$ $b'$ by the action of the cam-wheel L upon the truck K', this vertically-reciprocating movement causing the grooves cut into the material to consist of a series of concave sections, $m$, as shown in Figs. 7, 8, and 9, the length of which may be regulated by substituting different-shaped cams, while the depth of the grooves may be regulated by adjusting the set screws $k$ $k$, thus moving said cutter E toward the feed-roll L² or away from it, according as a deeper or more shallow groove is desired.

By removing the trucks K' from the machine and operating the same the cutter E will not be moved vertically, and the material acted upon will therefore be provided with grooves of an equal depth the entire length.

By means of the nut I the tension of the spring J may be regulated in a well-known manner.

What I claim as new, and desire to secure by Letters Patent of the United States, is—

1. In a wood-working machine, the combination of a rotating cutter, a reciprocating frame for carrying said cutter, one or more rolls or trucks mounted upon said frame, one or more rotating cams engaging with said trucks and moving said cutter toward the bed upon which the material is fed beneath the cutter, a spring for moving said cutter in the opposite direction, means for feeding beneath said cutter the material to be operated upon, one or more rolls located above the material to be operated upon and in contact therewith, one or more vertically-reciprocating frames carrying said rolls, and mechanism interposed between said roll-carrying frames and the frame of the machine, by which the pressure upon the material may be regulated.

2. In a wood-working machine, the combination of a rotating cutter, a reciprocating frame for carrying said cutter, a feed roll located beneath said cutter and adapted to feed the material to be operated upon between the said cutter and said feed-roll, one or more rolls or trucks mounted upon said frame, one or more rotating cams engaging with said trucks and adapted to move said frame in one direction, and a spring to move said frame and cutter in the opposite direction.

3. In a wood-working machine, the combination of a rotating cutter, a reciprocating frame for carrying said cutter, brackets adjustably secured to said frame, so that the distance of said frame from the bed of the machine, when the parts are in their normal positions, may be varied in order to vary the depth of the carving, means for feeding beneath the cutter the material to be acted upon, rolls or trucks mounted upon said brackets, rotating cam-wheels engaging with said trucks and moving said frame and cutter in one direction, and a spring for moving the same in the opposite direction.

4. In a wood-working machine, the combination of a rotating cutter, a reciprocating frame for carrying said cutter, feed-rolls for feeding beneath said cutter the material to be operated upon, one or more rolls or trucks mounted upon said frame, one or more rotating cams engaging with said trucks and moving said frame and cutter toward the feed-rolls as the trucks pass over the projections of said cam, a screw-shank rigidly secured to said frame and passing through an opening in a stationary plate forming part of the frame of the machine, a nut mounted upon the outer end of said shank, and a spring interposed between said nut and said plate and adapted to retain said trucks in engagement with said cams.

5. In a wood-working machine, the combination of a rotating cutter, a reciprocating frame for carrying said cutter, a feed-roll located beneath said cutter and adapted to feed the material to be acted upon between said cutter and said feed-roll, brackets adjustably secured to said frame, so that the distance of said frame from said feed-roll, when the parts are in their normal positions, may be varied in order to vary the depth of the carving, rolls mounted upon said brackets, rotating cam-wheels engaging with said trucks and moving said frame and cutter in one direction, and a spring for moving said cutter and frame in the opposite direction.

6. In a wood-working machine, the combination of a rotary cutter, a reciprocating frame for carrying said cutter, and which is provided with two downwardly-projecting arms, rolls or trucks mounted upon the lower ends of said arms, rotating cams located above said rolls and engaging with the same to move said frame toward the bed upon which the material is fed beneath said cutter, and a spring to move said frame in the opposite direction.

7. In a wood-working machine, the combination of a rotating cutter, a reciprocating frame for carrying said cutter, a feed-roll located beneath said cutter and adapted to feed the material to be operated upon between said cutter and said feed-roll, one or more rolls or trucks mounted upon said frame, one or more rotating cams engaging with said trucks and moving said cutter toward said feed-roll, and a spring for moving said frame and cutter away from said feed-roll.

8. In a wood-working machine, the combination of a rotating cutter, a reciprocating frame for carrying said cutter, a series of feed-rolls located beneath said cutter and adapted to feed the material beneath said cutter, one or more rolls or trucks mounted upon said frame, one or more rotating cams engaging with said trucks and moving said cutter toward said feed-rolls, a spring for moving said cutter in the opposite direction, one or more rolls located above the material to be operated upon and in contact therewith, one or more vertically-reciprocating frames carrying said rolls, and mechanism interposed between said roll-carrying frames and the frame of the machine, by which the pressure upon the material may be regulated.

In testimony whereof I have signed my name to this specification, in the presence of two subscribing witnesses, on this 15th day of March, A. D. 1888.

JOHN P. JAMISON.

Witnesses:
WALTER E. LOMBARD,
FRANK E. BRAY.